No. 758,757. PATENTED MAY 3, 1904.
W. R. JONES.
TRACTION ENGINE.
APPLICATION FILED JAN. 30, 1904.
NO MODEL. 2 SHEETS—SHEET 1.

Witnesses William R. Jones Inventor

No. 758,757. PATENTED MAY 3, 1904.
W. R. JONES.
TRACTION ENGINE.
APPLICATION FILED JAN. 30, 1904.
NO MODEL. 2 SHEETS—SHEET 2.
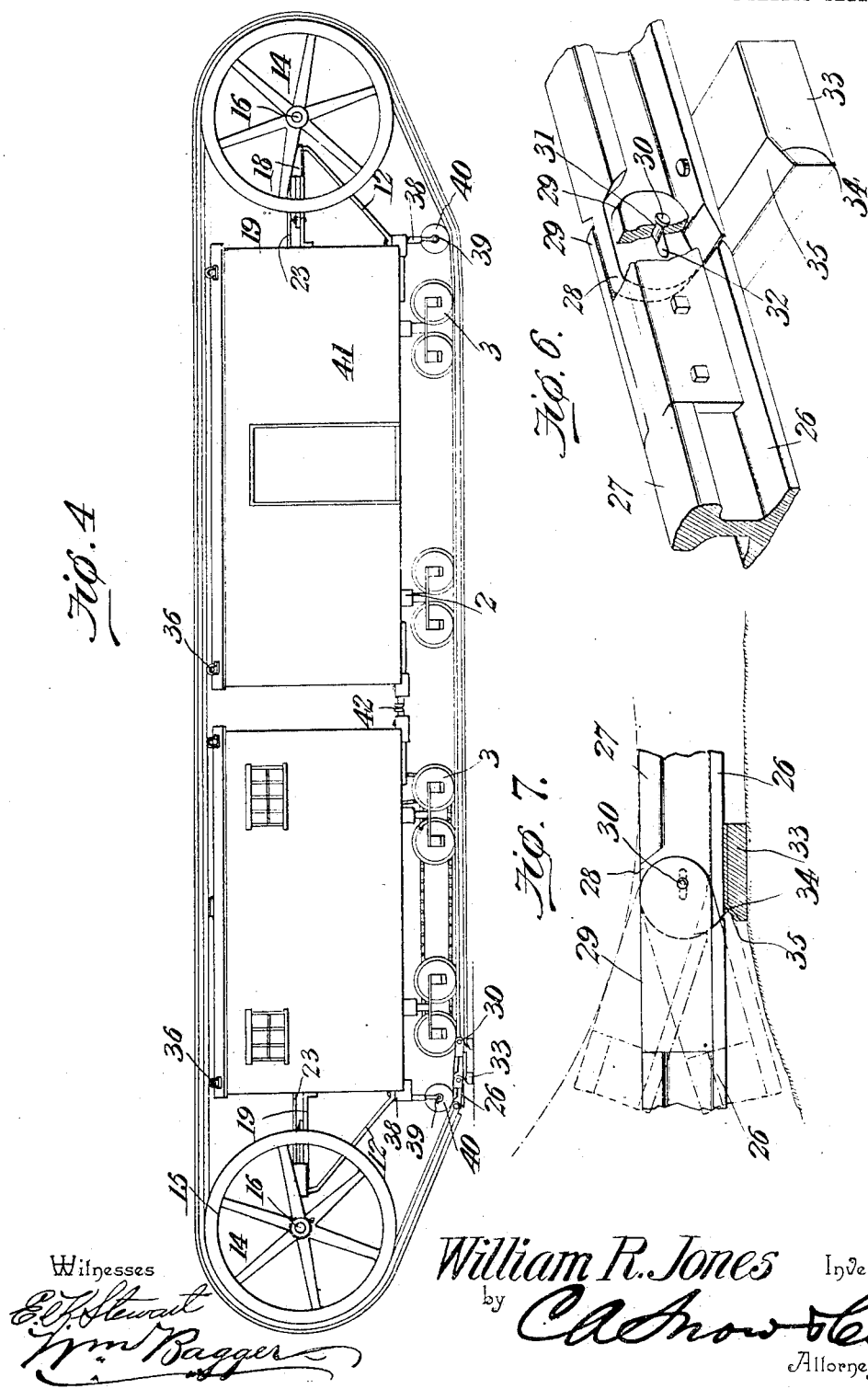

No. 758,757. Patented May 3, 1904.

UNITED STATES PATENT OFFICE.

WILLIAM R. JONES, OF KREMLIN, OKLAHOMA TERRITORY.

TRACTION-ENGINE.

SPECIFICATION forming part of Letters Patent No. 758,757, dated May 3, 1904.

Application filed January 30, 1904. Serial No. 191,376. (No model.)

*To all whom it may concern:*

Be it known that I, WILLIAM R. JONES, a citizen of the United States, residing at Kremlin, in the county of Garfield and Territory of Oklahoma, have invented a new and useful Traction-Engine, of which the following is a specification.

This invention relates to traction-engines of that class in which are combined a vehicle, a motor, means for transmitting motion from said motor to the wheels, and an endless track carried by the vehicle and supported in such a manner that a portion of said track shall be continuously laid in front of the vehicle when the latter is in motion, causing the wheels to travel upon said track, which is afterward taken up by suitable mechanism, carried over the top of the vehicle, and again laid in front, this operation continuing as long as the device is in motion.

The invention has for its object to provide a device of this class which shall possess superior advantages in point of simplicity, durability, and general efficiency in which one or more trailers or freight-carrying vehicles may be propelled by a single motor-vehicle by providing a track of suitable length, in which the said track shall be so constructed as to provide a smooth and level surface for the wheels to travel upon, and in which means shall be provided whereby the direction of movement of the vehicle may be easily and accurately controlled.

With these and other ends in view the invention consists in the improved construction, arrangement, and combination of parts, which will be hereinafter fully described, and particularly pointed out in the claims.

In the accompanying drawings has been shown a simple and preferred form of embodiment of my invention, it being understood, however, that I reserve the right to any changes and modifications within the scope of my invention which may be resorted to without departing from the spirit or sacrificing the utility of the same.

Figure 1:
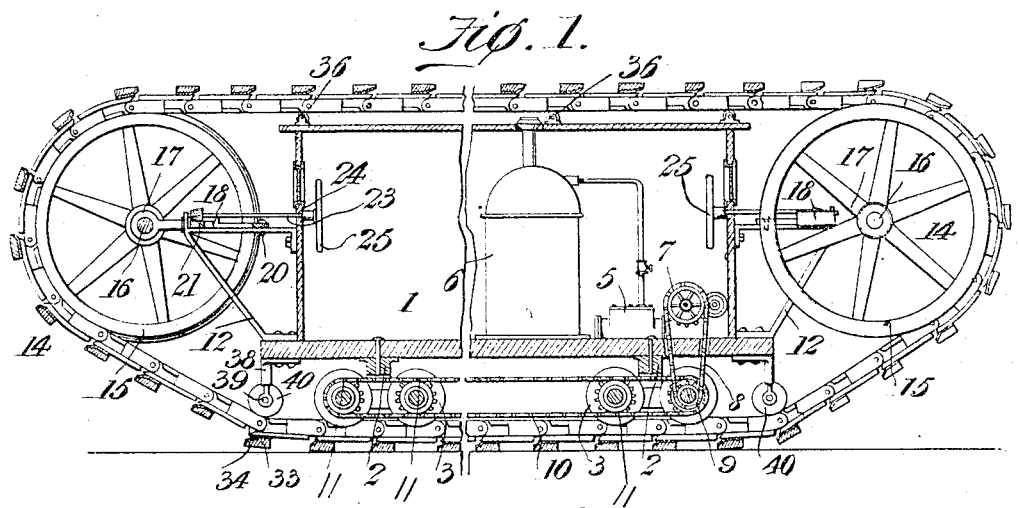
Figure 2:
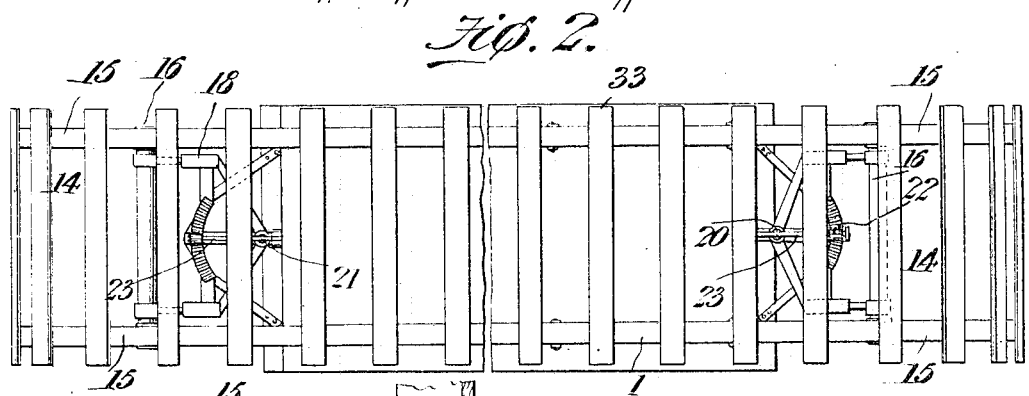
Figures 3, 5:
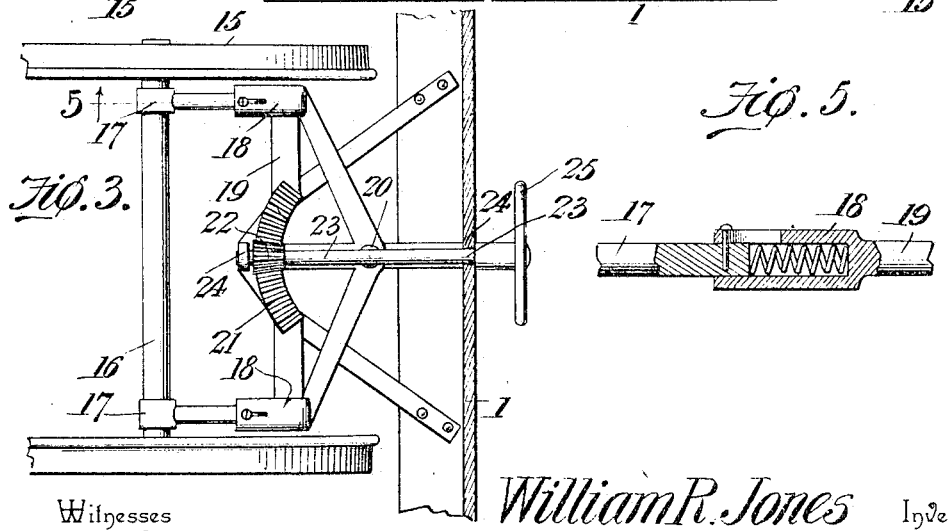

In said drawings, Figure 1 is a side elevation, partly in section, of a motor-vehicle constructed and equipped in accordance with the principles of my invention. Fig. 2 is a top plan view of the same. Fig. 3 is a detail plan view of the steering mechanism. Fig. 4 is a side view showing my improved motor-vehicle and a trailer propelled thereby. Fig. 5 is a sectional detail view taken on the line 5 5 in Fig. 3. Fig. 6 is a perspective detail view illustrating the track construction. Fig. 7 is a detail side view of a portion of the track.

Corresponding parts in the several figures are indicated by similar numerals of reference.

The motor-vehicle of my invention consists of a body 1, supported upon trucks 2 2, carrying wheels 3. By preference these trucks are connected pivotally with the vehicle-body in order to facilitate the turning of curves, and each truck is provided with four wheels.

The body of the vehicle supports a motor, which in the present instance has been illustrated as a steam-engine 5, the steam for which is supplied by a boiler 6. I desire it to be distinctly understood, however, that any other well-known form of a motor may be substituted, such as a gasolene-engine or any other motor that may be found efficient for the purpose. Rotary motion is imparted by the motor to a sprocket-wheel 7, which is connected by a chain 8 with a sprocket-wheel 9 upon one of the axles carrying the wheels 3. Motion may be transmitted from the supporting-wheel 3, which receives motion direct from the source of power, to the remaining supporting-wheels of the vehicle by means of a chain 10 and sprocket-wheels 11, fixed upon the hubs of the respective wheels; but this is not essential.

At the front and rear ends of the vehicle-body 1 are provided outwardly-extending frames or brackets 12, which are strongly braced and reinforced to carry the weight of the wheels 14, supporting the endless track of the device. Under the construction illustrated in the accompanying drawings the reels 14 consist each of a pair of suitably-constructed flanged wheels 15, mounted upon a shaft 16, which is journaled in a pair of boxes 17, mounted slidingly in sockets 18, formed in a supporting-table 19, which latter is pivotally mounted upon the bracket or supporting device 12 by means of a heavy vertical bolt 20. The table 19 being thus pivotally mounted may be designated a "turn-table," and it is provided with a suitably-disposed segmental rack 21, engaged by a pinion 22, which is mounted upon a shaft 23, suitably supported in bearings 24 and having a hand-wheel 25, whereby it may be manipulated to turn the table 19 upon its pivot. This device constitutes the steering-gear of my improved traction-engine, and while it is not absolutely essential that a steering-gear should be mounted at each end of the motor-vehicle I consider it preferable to provide it when necessary for guiding the movement of the vehicle when backed. The turn-table 19, carrying the track-supporting reel and other related parts, is readily detachable by simply removing the bolt 20 for purposes to be hereinafter set forth.

The track of my improved traction-engine is made up of a plurality of links or rail-sections 26, having top flanges 27 and rounded front ends 28, which are trimmed to engage between a pair of lugs 29, riveted to the sides of and extending rearwardly from the link or rail-section next in front. The connection between adjacent rail-sections is formed by a pivotal pin 30, extending through perforations 31 in the lugs 29 and through a slot 32 near the front end of the adjacent rail-section. The links or rail-sections are trimmed and connected in such a manner as to provide a smooth and unbroken surface for the track-supporting wheels of the vehicle, the slots 32 being provided for the purpose of permitting a slight lateral play between the respective sections, which will be necessary when in directing the machine around a curve it becomes necessary to deposit the track upon the ground in front of the vehicle in a curved line.

The track is composed of two endless chains composed of the links or rail-sections herein described, and the links or sections of said chains are connected in pairs by means of cross-ties 33 of suitable length and dimensions, said cross-ties being provided adjacent to the front ends of the links, which are connected thereby with beveled edges 34, protected by caps or plates 35, of sheet metal, which are interposed between the rail-sections and the cross-ties in order to protect the latter from wear.

The chains constituting the track are mounted, as will be seen in the drawings, upon the reels 14 at the front and rear ends of the motor-vehicle in such a manner as to pass under the supporting-wheels of the latter and over a plurality of supporting-rollers 36 upon the top of the vehicle. Provision for taking up slack in the chains constituting the track is made by placing powerful coiled springs in the sockets 18, in which the boxes 17, carrying the reel-shafts, are slidingly mounted, said springs forcing the said boxes outwardly, and thereby taking up slack in the said chains.

The supporting-wheels 3 are flanged after the manner of ordinary car-wheels, so as to travel smoothly and evenly upon the track. In order to depress the latter in front of the front wheels, I provide at the front end of the motor-vehicle a frame 38, carrying a shaft 39, upon which is mounted a wooden roller 40, which serves to engage the upper side of the track and to depress the latter in front of the front supporting-wheels.

In Fig. 4 of the drawings I have shown a trailer or freight-carrying vehicle 41 connected with my improved motor-vehicle by means of a coupling 42. One or more such trailers may be used, and when they are used it becomes necessary to shift the track-carrying reel 14 from the rear end of the motor-vehicle to the rear end of the rearmost trailer, it being also obviously necessary to increase the length of the track to a sufficient extent.

The operation and advantages of this device will be readily understood from the foregoing description, taken in connection with the drawings hereto annexed. When the machine is in motion, power is transmitted from the motor to one of the supporting-wheels and from the latter to the remaining supporting-wheels of the motor-vehicle. The latter being thus impelled in a forward direction will travel over the track, which is thus necessarily set in motion and is caused to travel around the supporting-reels. A smooth track being thus provided, it is evident that the motor may be run over comparatively rough country at a considerable rate of speed and that it may be utilized for hauling freight, which may thus be transported at a small expense. The general construction of the device is simple. It may be easily steered by so adjusting the table carrying the front reel-supporting shaft as to cause the track to be laid in a curve, and an apparatus embodying my invention may be constructed at comparatively slight expense.

Regarding the precise construction of the links or sections composing the tracks, I desire it to be understood that various modifications may be resorted to without departing from the spirit of my invention, an essential point, however, being the presence of the slots 32, whereby the links or track-sections are connected with a sufficient degree of flexibility to enable the steering mechanism to be effectively used.

Having thus described my invention, I claim—

1. In a device of the class described, an endless track comprising two chains of links or track-sections flexibly connected by means of pins engaging slots at the front end of each link or section, cross-ties connecting the links of the two chains in pairs, and supporting-reels for the endless track, one of said reels being pivotally mounted to direct the laying of the track.

2. In a device of the class described, an endless track consisting of two chains of links, each link constituting a track-section, the links of said chains being connected in pairs by means of cross-ties having beveled front edges and wear-plates interposed between said beveled edges and the links or track-sections.

3. In a device of the class described, a motor-vehicle, a supporting-bracket at the front end of said vehicle, a turn-table mounted upon said bracket and having sockets formed therein, boxes mounted slidably in said sockets, a reel-carrying shaft journaled in said boxes, and springs in said sockets, exerting an outward pressure against said boxes.

4. In a device of the class described, a motor-vehicle, an endless track, supporting-reels for said track, turn-tables having sockets, spring-pressed boxes mounted slidably in said sockets, shafts journaled in said boxes, reels upon said shafts supporting the endless track, and means for adjusting the front turn-table upon its pivots to direct the laying of the track.

5. In a device of the class described, an endless track, vehicles supported upon the lower lead of said track and having means for supporting the upper lead of the same, track-supporting reels, means for adjusting the front track-supporting reel to direct the laying of the track, and a track-engaging pressure-roller disposed between the front reel and the wheels of the front truck.

In testimony that I claim the foregoing as my own I have hereto affixed my signature in the presence of two witnesses.

WILLIAM R. JONES.

Witnesses:
H. M. SPALDING,
S. A. REED.